United States Patent
Horn et al.

(10) Patent No.: US 9,053,008 B1
(45) Date of Patent: Jun. 9, 2015

(54) SYSTEMS AND METHODS FOR PROVIDING INLINE PARAMETER SERVICE IN DATA STORAGE DEVICES

(75) Inventors: Robert L. Horn, Yorba Linda, CA (US); Sebastien A. Jean, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/430,447

(22) Filed: Mar. 26, 2012

(51) Int. Cl.
*G06F 12/02* (2006.01)

(52) U.S. Cl.
CPC ................................. *G06F 12/0246* (2013.01)

(58) Field of Classification Search
CPC .................................................. G06F 12/0246
USPC .................................................. 711/103, 102
See application file for complete search history.

(56) References Cited

U.S. PATENT DOCUMENTS

| | | | |
|---|---|---|---|
| 6,148,354 A | 11/2000 | Ban et al. | |
| 6,182,248 B1 | 1/2001 | Armstrong et al. | |
| 6,304,984 B1 | 10/2001 | Neal et al. | |
| 6,519,718 B1 | 2/2003 | Graham et al. | |
| 6,735,661 B2 | 5/2004 | Gelke et al. | |
| 6,785,767 B2 | 8/2004 | Coulson | |
| 6,856,556 B1 | 2/2005 | Hajeck | |
| 6,988,175 B2 | 1/2006 | Lasser | |
| 7,103,684 B2 | 9/2006 | Chen et al. | |
| 7,126,857 B2 | 10/2006 | Hajeck | |
| 7,127,549 B2 | 10/2006 | Sinclair | |
| 7,136,973 B2 | 11/2006 | Sinclair | |
| 7,430,136 B2 | 9/2008 | Merry, Jr. et al. | |
| 7,447,807 B1 | 11/2008 | Merry et al. | |
| 7,460,394 B2 * | 12/2008 | Happ et al. | 365/163 |
| 7,502,256 B2 | 3/2009 | Merry, Jr. et al. | |
| 7,509,441 B1 | 3/2009 | Merry et al. | |
| 7,594,135 B2 | 9/2009 | Gonzalez et al. | |
| 7,596,643 B2 | 9/2009 | Merry, Jr. et al. | |
| 7,623,401 B2 * | 11/2009 | Philipp et al. | 365/222 |
| 7,631,245 B2 | 12/2009 | Lasser | |
| 7,653,778 B2 | 1/2010 | Merry, Jr. et al. | |

(Continued)

FOREIGN PATENT DOCUMENTS

WO    WO2011019596 A2    2/2011

OTHER PUBLICATIONS

Office Action dated Oct. 23, 2013 from U.S. Appl. 13/297,163 No., 34 pages.

(Continued)

*Primary Examiner* — Aimee Li
*Assistant Examiner* — Trang Ta

(57) ABSTRACT

Disclosed herein is a controller architecture that pairs a controller with a NVM (non-volatile memory) storage system over a high-level, high speed interface such as PCIe. In one embodiment, the NVM storage system includes a bridge that communicates with the controller via the high-level interface, and controls the NVM via an interface. The controller is provided a rich set of physical level of controls over individual elements of the NVM. In one embodiment, the controller includes a volatile memory (e.g., DRAM) that stores parameters related to the operation of the NVM as provided by the bridge. The parameters may be related to optimizing use of the NVM and are automatically appended by the controller to appropriate data storage commands to the bridge. The parameters may be stored in a table format in which each entry is indexed by a physical address of the NVM.

12 Claims, 11 Drawing Sheets

(56) References Cited

U.S. PATENT DOCUMENTS

| | | |
|---|---|---|
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,716,411 B2 | 5/2010 | Panabaker et al. |
| 7,733,712 B1 | 6/2010 | Walston et al. |
| 7,765,373 B1 | 7/2010 | Merry et al. |
| 7,861,038 B2 | 12/2010 | Fontenot et al. |
| 7,861,122 B2 | 12/2010 | Cornwell et al. |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,957,173 B2 | 6/2011 | Kim |
| 7,962,777 B2 | 6/2011 | Gonzalez et al. |
| 7,962,792 B2 | 6/2011 | Diggs et al. |
| 7,970,978 B2 | 6/2011 | Luo et al. |
| 8,065,304 B2 | 11/2011 | Ross |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,120,969 B1 * | 2/2012 | Montierth et al. ........ 365/185.25 |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,291,295 B2 | 10/2012 | Harari et al. |
| 8,296,625 B2 | 10/2012 | Diggs et al. |
| 8,312,207 B2 | 11/2012 | Merry, Jr. et al. |
| 8,315,092 B2 * | 11/2012 | Strasser et al. ........... 365/185.03 |
| 8,316,176 B1 | 11/2012 | Phan et al. |
| 8,341,339 B1 | 12/2012 | Boyle et al. |
| 8,341,374 B2 | 12/2012 | Kwon et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,443,263 B2 | 5/2013 | Selinger et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2002/0053010 A1 | 5/2002 | Piccirillo et al. |
| 2003/0165076 A1 | 9/2003 | Gorobets et al. |
| 2003/0172261 A1 | 9/2003 | Lee et al. |
| 2005/0160217 A1 | 7/2005 | Gonzalez et al. |
| 2005/0223373 A1 | 10/2005 | Gage et al. |
| 2005/0251617 A1 | 11/2005 | Sinclair et al. |
| 2006/0248387 A1 | 11/2006 | Nicholson et al. |
| 2007/0038901 A1 | 2/2007 | Shiota et al. |
| 2007/0180328 A1 | 8/2007 | Cornwell et al. |
| 2007/0190328 A1 | 8/2007 | Cowburn et al. |
| 2007/0220202 A1 | 9/2007 | Sutardja et al. |
| 2007/0245092 A1 | 10/2007 | Yeh |
| 2007/0288683 A1 | 12/2007 | Panabaker et al. |
| 2007/0288692 A1 | 12/2007 | Bruce et al. |
| 2008/0040531 A1 | 2/2008 | Anderson |
| 2008/0192928 A1 | 8/2008 | Yu et al. |
| 2008/0215808 A1 | 9/2008 | Ashmore et al. |
| 2008/0250270 A1 | 10/2008 | Bennett |
| 2009/0013233 A1 | 1/2009 | Radke |
| 2009/0024793 A1 | 1/2009 | Fontenot et al. |
| 2009/0037652 A1 | 2/2009 | Yu et al. |
| 2009/0063730 A1 | 3/2009 | Gower et al. |
| 2009/0150605 A1 | 6/2009 | Flynn et al. |
| 2009/0158124 A1 | 6/2009 | Kawai et al. |
| 2009/0172257 A1 | 7/2009 | Prins et al. |
| 2009/0240873 A1 | 9/2009 | Yu et al. |
| 2009/0282305 A1 | 11/2009 | Chen et al. |
| 2009/0313411 A1 | 12/2009 | Stenfort |
| 2010/0023800 A1 | 1/2010 | Harari et al. |
| 2010/0037012 A1 | 2/2010 | Yano et al. |
| 2010/0088459 A1 | 4/2010 | Arya et al. |
| 2010/0100675 A1 | 4/2010 | Furuhjelm |
| 2010/0122022 A1 | 5/2010 | Luo et al. |
| 2010/0174849 A1 | 7/2010 | Walston et al. |
| 2010/0174851 A1 | 7/2010 | Leibowitz et al. |
| 2010/0180182 A1 | 7/2010 | Trantham |
| 2010/0205517 A1 | 8/2010 | Lee et al. |
| 2010/0217924 A1 | 8/2010 | Panabaker et al. |
| 2010/0250793 A1 | 9/2010 | Syu |
| 2010/0268874 A1 | 10/2010 | Pyeon |
| 2010/0281342 A1 | 11/2010 | Chang et al. |
| 2010/0325352 A1 | 12/2010 | Schuette et al. |
| 2010/0327923 A1 | 12/2010 | Pyeon et al. |
| 2011/0010491 A1 | 1/2011 | Anderson |
| 2011/0035540 A1 | 2/2011 | Fitzgerald et al. |
| 2011/0040924 A1 | 2/2011 | Selinger |
| 2011/0041039 A1 * | 2/2011 | Harari et al. .................. 714/773 |
| 2011/0082985 A1 | 4/2011 | Haines et al. |
| 2011/0099323 A1 | 4/2011 | Syu |
| 2011/0107076 A1 | 5/2011 | Kim et al. |
| 2011/0119442 A1 | 5/2011 | Haines et al. |
| 2011/0138112 A1 | 6/2011 | Chiang et al. |
| 2011/0145489 A1 | 6/2011 | Yu et al. |
| 2011/0238885 A1 | 9/2011 | Kitahara et al. |
| 2011/0283049 A1 | 11/2011 | Kang et al. |
| 2011/0283135 A1 | 11/2011 | Burger et al. |
| 2011/0289267 A1 | 11/2011 | Flynn et al. |
| 2011/0320915 A1 | 12/2011 | Khan |
| 2012/0008414 A1 * | 1/2012 | Katz et al. ................. 365/185.24 |
| 2012/0102263 A1 | 4/2012 | Aswadhati |
| 2012/0131268 A1 | 5/2012 | Anderson |
| 2012/0203951 A1 * | 8/2012 | Wood et al. .................... 711/102 |
| 2012/0221922 A1 | 8/2012 | Bennett |
| 2012/0233380 A1 | 9/2012 | Butterfield |
| 2012/0260020 A1 | 10/2012 | Suryabudi et al. |
| 2012/0265926 A1 | 10/2012 | Tal et al. |
| 2012/0278531 A1 | 11/2012 | Horn |
| 2012/0284460 A1 | 11/2012 | Guda |
| 2012/0324191 A1 * | 12/2012 | Strange et al. ................. 711/165 |
| 2013/0060981 A1 | 3/2013 | Horn et al. |
| 2013/0073785 A1 * | 3/2013 | Emma et al. ................... 711/103 |
| 2013/0132638 A1 | 5/2013 | Horn et al. |
| 2013/0145106 A1 | 6/2013 | Kan |

(56) References Cited

U.S. PATENT DOCUMENTS

| | | |
|---|---|---|
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |

OTHER PUBLICATIONS

Sebastien A. Jean, et al., U.S. Appl. No. 13/297,163, filed Nov. 15, 2011, 40 pgs.

Sebastien A. Jean, U.S. Appl. No. 13/297,082, filed Nov. 15, 2011, 28 pgs.

\* cited by examiner

| Command | Flash Die |
|---|---|
| A (unordered) | 0, 1 |
| B (unordered) | 0, 1, 2 |
| C (unordered) | 3 |
| D (unordered) | 4 |

SYSTEMS AND METHODS FOR PROVIDING INLINE PARAMETER SERVICE IN DATA STORAGE DEVICES

BACKGROUND

1. Technical Field

This disclosure relates to non-volatile storage systems, including but not limited to flash drives. More particularly, the disclosure relates to systems and methods for an enhanced controller architecture in solid state drives.

2. Description of the Related Art

Various types of controller architecture exist for controlling flash media. The Open NAND Flash Interface (ONFI) is a standard interface that specifies some common sets of commands that flash memory manufacturers should support. ONFI supports some low level rudimentary I/O operations that can include, for example, page write/read and block erase. However, effective flash media management often involves a number of high level and potentially process-intensive functions such as logical-to-physical mapping, garbage collection, and wear leveling. These functions are beyond the scope of ONFI and thus an effective controller architecture needs to address these needs while providing a high level of data throughput performance to the host.

BRIEF DESCRIPTION OF THE DRAWINGS

Systems and methods that embody the various features of the invention will now be described with reference to the following drawings, in which.

DETAILED DESCRIPTION

While certain embodiments of the inventions are described, these embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions.

I. Controller/Bridge Designs

Figure 1A:
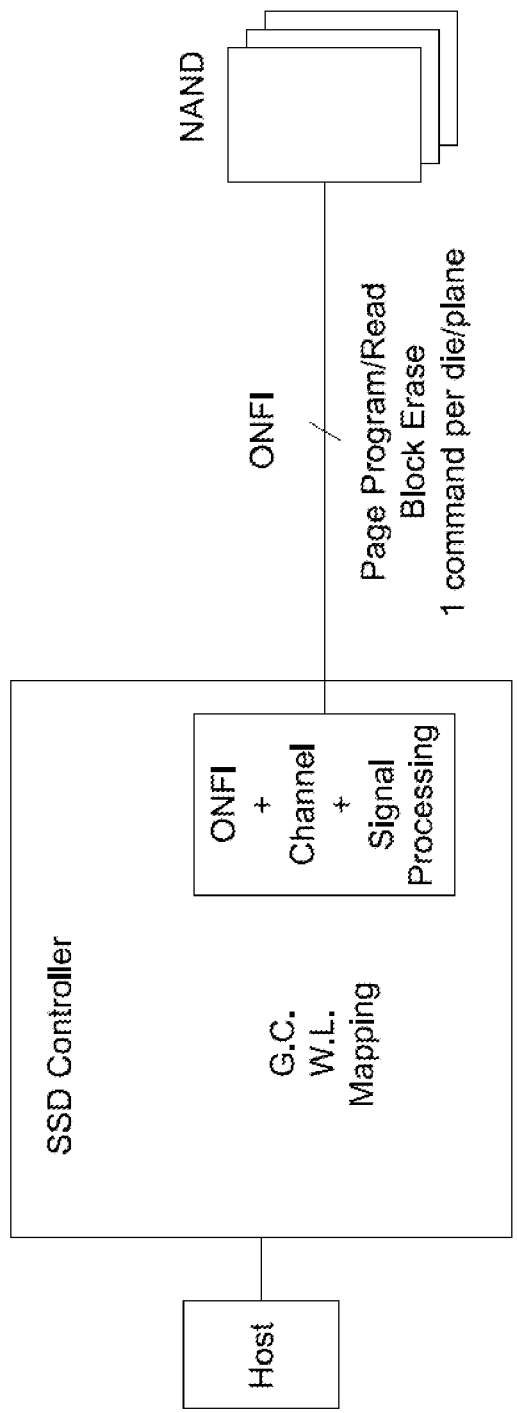
FIGS. 1A-1C illustrate several solid-state drive (SSD) controller architectures.
Figure 1B:
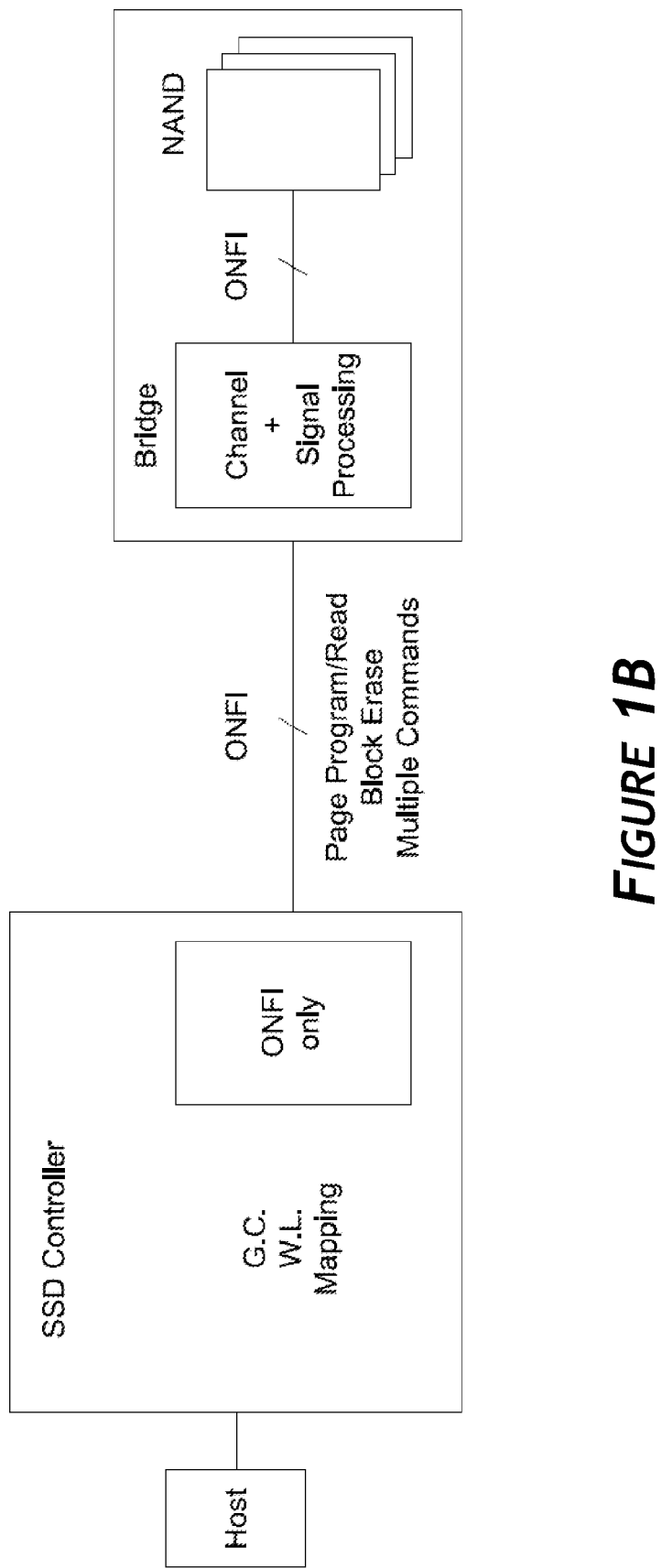
Figure 1C:
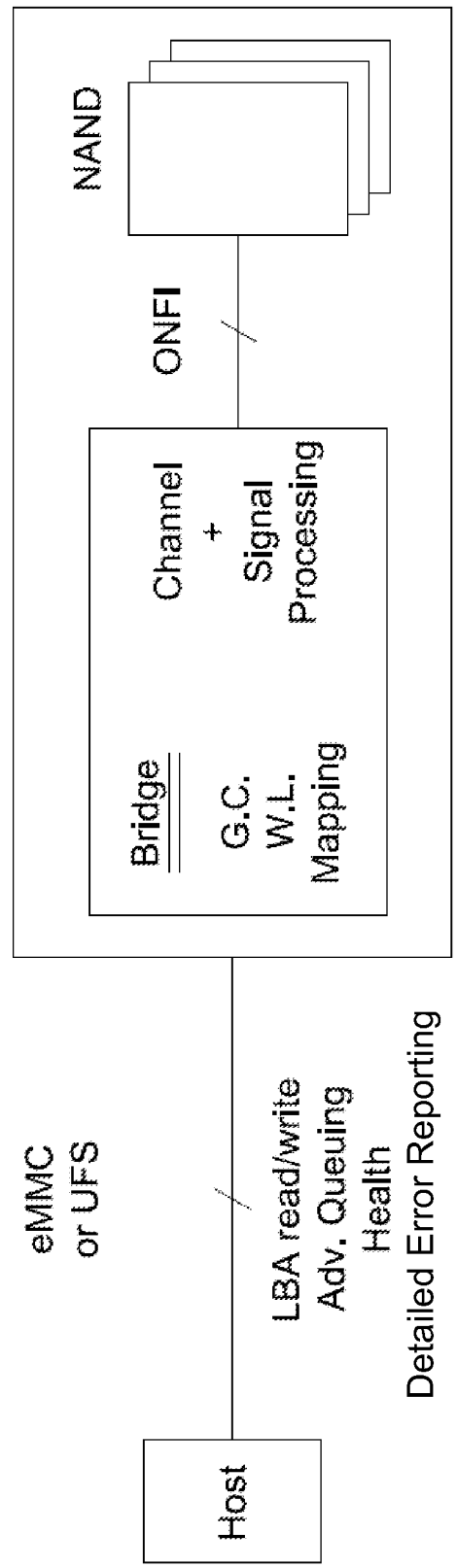

FIGS. 1A-1C illustrate a number of SSD controller architectures. FIG. 1A illustrates a SSD controller that includes an ONFI (Open NAND Flash Interface) interface. The ONFI interface is a low level, parallel I/O interface that provides basic command support to enable an external component such as a host controller to control operations in a NAND. FIG. 1A shows a typical setup in which a host device such as a computer that includes a SSD controller, which in turn includes an ONFI interface for controlling a non-volatile memory (NVM) unit that supports ONFI. The ONFI interface provides some basic level of control over operations such as page program, page read, block erase, etc. Current versions of ONFI support one command per die and plane, and provide some basic queuing capability through commands such as "read multiple" and "write multiple" commands. However, there can be no mixing of different types of commands. Moreover, commands are batch processed, which means that the commands must clear the queue completely before more commands can be accepted. The SSD controller in this approach would perform high level NVM management functions such as garbage collection, wear leveling, mapping etc.

FIG. 1B illustrates an alternative approach in which the NVM is coupled with a bridge controller/device that performs some level of basic channel management of the NAND and signal processing. The bridge may provide an ONFI or ONFI-equivalent interface to the SSD controller. However, this interface may be modified from the standard ONFI interface, and may support additional capabilities such as supporting multiple commands. The SSD controller, in this design, would still perform high level NAND management functions such as garbage collection, and communicate with the bridge via the ONFI or ONFI-equivalent interface.

FIG. 1C depicts a third approach in which the NVM is coupled with a bridge in a storage system. In this approach, the bridge performs a number of high level NVM management functions such as garbage collection, wear leveling, and mapping, as well as the lower level functions such as channel management and signal processing. The storage system is coupled with the host device through a high level I/O interface such as eMMC or UFS. This is a common design found in many memory card products. The host sends over commands to the storage system (such as read and write commands) using logical addressing. Features such as advanced command queuing, health reporting, and detailed error reporting may be supported.

II. System Overview

Figure 1D:
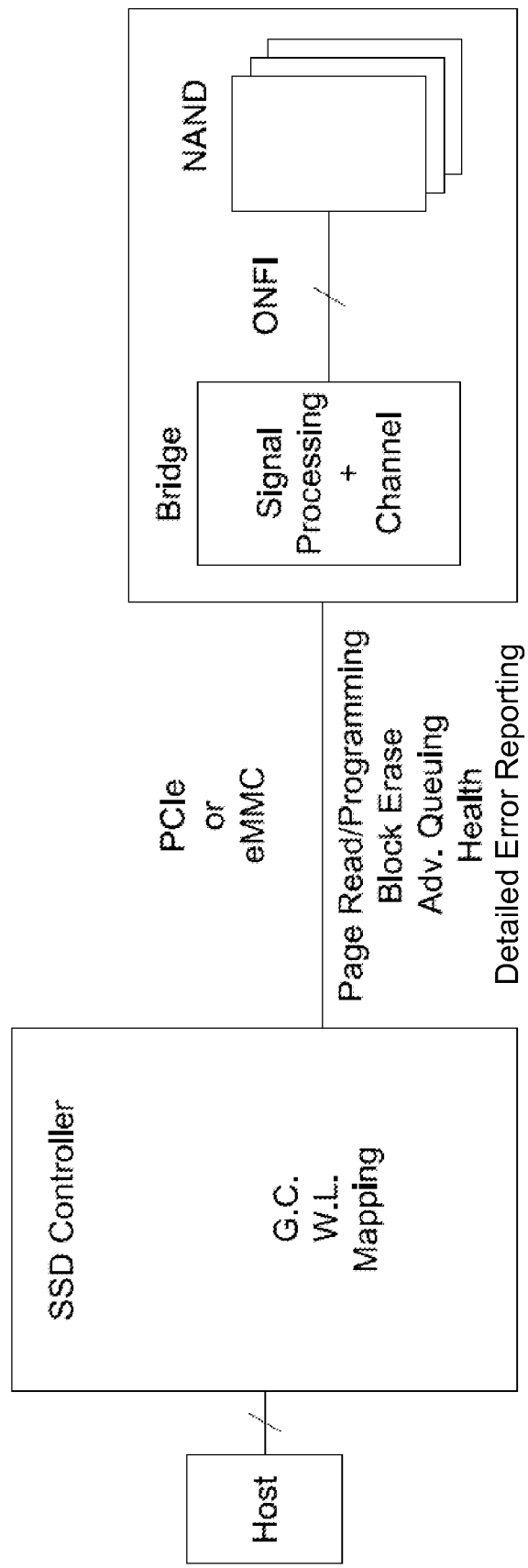
FIG. 1D is a block diagram showing the controller architecture according to an embodiment.

FIG. 1D is a block diagram that illustrates a controller design architecture according to some embodiments of the invention. FIG. 1D shows a SSD controller performing high level NVM management functions such as garbage collection, wear leveling, etc. In one embodiment, the SSD controller is coupled with a NVM storage system over a high level, high speed interface such as PCIe and eMMC. In lieu of PCIe or eMMC, other standardized and/or proprietary interfaces could be extended for use as this bus interface. The NVM storage system in one embodiment includes a bridge that communicates with the SSD controller via the high level, high speed interface, and controls the NAND memory with a low level interface such as ONFI. As shown, additional features such as advanced command queuing, health reporting, and detailed error reporting may be supported over the high level interface.

Unlike the designs described above, the controller in this architecture is provided a rich set of physical level of controls over individual elements of the NVM (e.g., page level control) over a sophisticated and fast interface such as PCIe. It is observed that in many controller-bridge type designs that the bridge is typically implemented on a processor with reduced performance due to power concerns, while the controller typically is in an environment that faces less power concerns. If the processor intensive functionalities are shifted to the higher performing controller, then overall latency can be reduced. Thus, in some embodiments, the controller is typically implemented in a higher powered processor that can support the advanced NVM management functions. The bridge, on the other hand, is implemented in some embodiments in a lower powered processor to minimize energy usage of the overall NVM storage module/unit. As a result, the bridge may perform basic signal processing and channel management of the NVM, as well as some basic error correction functions and XOR parity accumulation. In some embodiments, the controller performs logical-to-physical address mapping, garbage collection, wear leveling, parity management (via control of the parity accumulator in the bridge), RAID striping, etc. This division of labor still provides the controller direct, physical (e.g., page-level) control of the NVM, resulting in the controller managing the NVM at both the page and block level over a fast, high level interface such as PCIe. The controller in one embodiment also manages other integrated services such as the XOR parity accumulator in the bridge.

In one embodiment, another advantage of the architecture's division of the management tasks relates to NVM industry trends. Physical management of the NVM is becoming increasingly important as the most common type of NVM, e.g., MLC (Multi-Level Cell) NAND, continues to evolve to provide higher capacity at the cost of reduced endurance. For example, today's MLC products with a 5,000 P/E-cycle endurance are being replaced with next-generation MLC products with a 1,500-2,000 P/E-cycle endurance. Commonly, the bridge designer is in the best position to understand the physical properties of the NVM and how best to extend its life by implementing various endurance enhancement/management functionalities. Because of this rapidly changing technological landscape, and because each individual NVM manufacturer may require different such endurance enhancement/management functionalities, these functionalities may constantly require fine-tuning to suit the diverse and ever-change varieties of NVM products. Thus, the architecture of some embodiments provides another advantage in its labor division by isolating these functions in the bridge and allowing the controller designer to focus on the high level data management functions. In other words, since the controller and the bridge have different design constraints and priorities, under the architecture each may be updated according to different schedules and manners without a complete redesign of the whole.

With the reduced latency provided by the design, the bridge may be paired with less expensive media. For example, the bridge may be paired with MLC NAND rather SLC (Single-Level Cell) NAND while still meeting performance metrics demanded by customers. In addition, in some embodiments the above described controller-bridge design can be adapted for use in a hybrid drive comprising flash memory and hard disk components. In those embodiments the controller, in addition to managing data accesses to the NVM through the bridge, would also manage data accesses to one or more hard drives. Additional features of this design will be further illustrated below with various drawings and descriptions of the embodiments of the invention.

II.A. Controller-Bridge Implementation

Figure 2A:
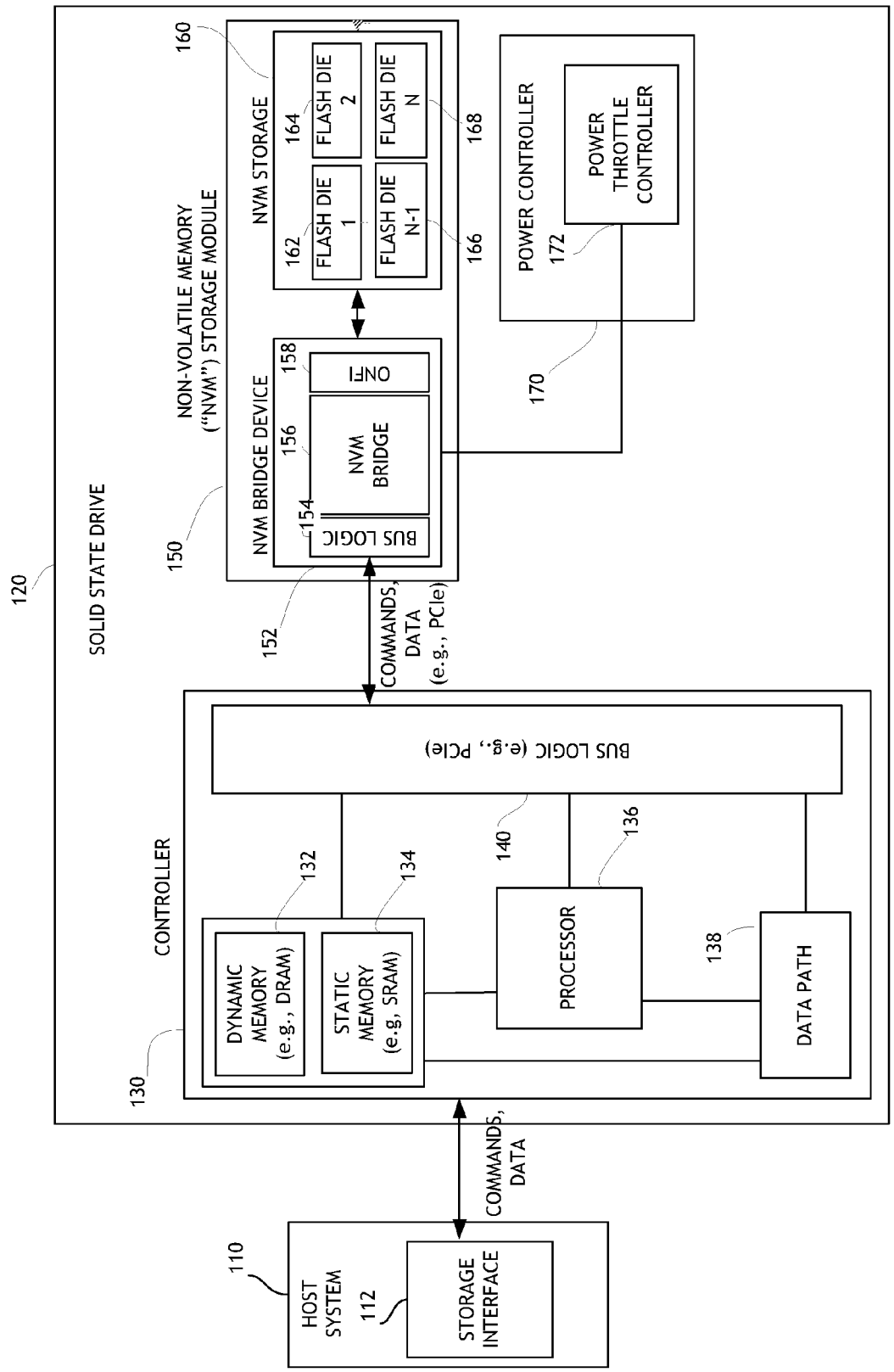
FIGS. 2A and 2B are block diagrams showing the controller architecture according to some embodiments.

FIG. 2A shows an embodiment of a controller-bridge architecture previously introduced in FIG. 1D. As shown, a solid-state non-volatile storage system 120 is connected to a host system 110. The host system 110 communicates with the non-volatile storage system 120 using a storage interface 112. The host's storage interface 112 can communicate with the non-volatile storage system 120 using any known communication protocol, such as SATA, SCSI, SAS, USB, Fibre Channel, PCIe, eMMC, etc.

In one embodiment, the non-volatile storage system 120 includes a controller 130 and a NVM storage module 150. The controller 130 in one embodiment communicates with a bridge device 152 within the NVM storage module 150 via a high level interface such as PCIe (through bus logic/interface 140). PCIe is used in one embodiment as it defines a rich packet based routing and Quality of Service (QoS) infrastructure and provides a high speed interface. The controller may include a processor 136 to control data functions, and the core may be coupled with static memory 132 and dynamic memory 134. The controller 130 may also include a data path 138 for processing/transferring data related to data access commands from the host system 110. In one embodiment, the controller 130 is implemented on a SoC (System on Chip), though those skilled in the art will recognize that other hardware/firmware implementations are possible.

In one embodiment, the use of PCIe means that the address range assigned to a device function is used for packet routing both on the fabric and within the device. In one embodiment, the PCIe transaction layer delivers packets to an internal register interface that is read by firmware. Advanced devices often direct incoming packets to internal RAM or hardware acceleration modules.

The bridge device 152 in one embodiment comprises bus logic/interface 154 for communicating with the bus logic/interface 140 (on the controller 130) over the high level interface bus. On the other end of the bridge, the bridge device 152 includes a low level interface 158 such as ONFI for communicating with the NVM storage 160 (e.g., NAND), which may include a number of storage devices such as flash dies 162, 164, 166, and 168. Although ONFI is depicted in this embodiment, other suitable flash memory interfaces may be used. In another embodiment, the bridge may use a different interface such as Toggle or a proprietary interface to communicate with the NVM storage 160, or send direct commands to the storage.

II.B. Division of Labor

The advantages of dividing the NVM management functions were outlined above in Section II. In particular, the architecture reduces latency and addresses the various design constraints while allowing the controller and bridge designers to optimize their respective portions of the architecture. In one embodiment, the controller is responsible for block level management, parity stripe layout, garbage collection, wear leveling, handling read disturb and error recovery. The bridge device, in one embodiment, manages the raw NVM flash interface. It may also provide one or more of: command queuing, error correction, XOR parity accumulator, data protection, and enhances block endurance. The interface between the bridge and the controller in one embodiment is a lightweight PCIe-based data and management interface. The controller uses the interface control command to configure the bridge and data commands to access the NVM media.

It is also noted that the controller uses physical page addressing instead of a logical one that is common in existing controller-bridge designs. The bridge can identify the relationship between pages, blocks, planes, and dies. This gives the controller the greatest flexibility for creating RAID stripe layout, performing data moves, and handling bad blocks. These details are abstracted from the bridge. When using direct addressing, the controller simply provides a set of direct page addresses in the command header to the bridge. In one embodiment, the pages are not necessarily sequential or even in the same block. In most cases, the controller will access pages spread across multiple planes and multiple dies in order to maximize concurrent hardware access.

II.C. Hybrid Application

Figure 2B:
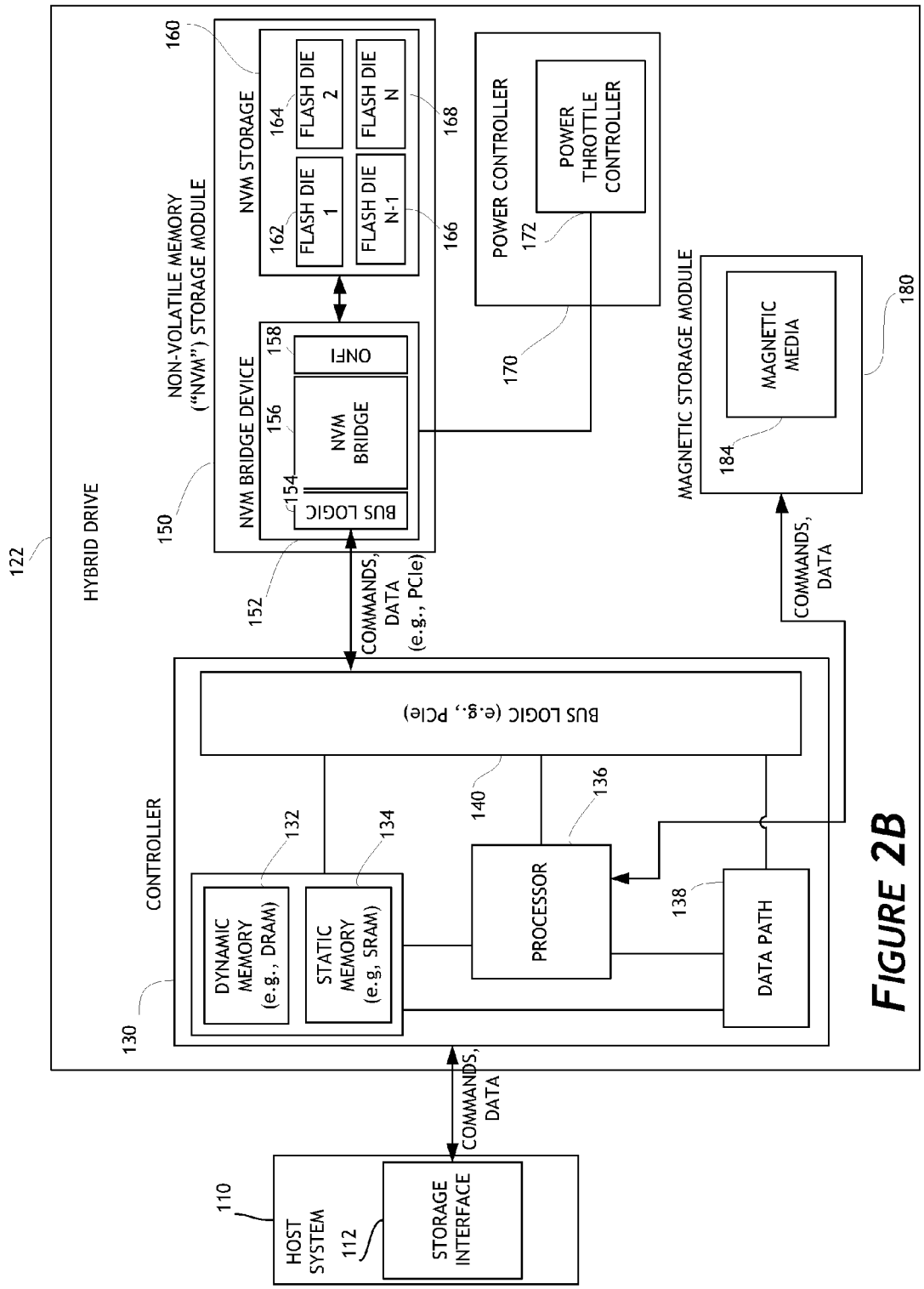

Some embodiments of the controller-bridge architecture can be adapted for other uses. For example, FIG. 2B shows the use of the controller architecture in a hybrid drive 122, which in addition to the NVM and bridge components described above, includes a magnetic storage module 180 which has a magnetic media 184 such as a rotating hard disk drive (HDD). The controller 130 in this embodiment would thus manage data accesses to both the NVM storage module 150 and magnetic storage module 180. In one embodiment, a different interface than interface 140 (which connects to the NVM) may be used to connect the controller 130 to the magnetic storage module 180.

The hybrid application illustrates an additional advantage of the controller architecture. A hybrid drive typically includes an SSD that has its own internal controller that has a mapping table to address the NVM within the SSD. While the HDD portion of the hybrid is typically addressed directly, the hybrid controller uses a special mapping table to determine whether data is in the SSD or the HDD. The use of this special mapping table along with the internal SSD mapping table introduces duplicate overhead in cases where data is accessed in the SSD portion of the hybrid, since there are two mapping tables and there is significant cost associated with maintaining each table.

In contrast, because the controller 130 in the present architecture manages the NVM at both the block and page levels and the magnetic media, it can provide uniformed address management across the flash and magnetic media in a single location. Hence there is no need to have the two tables noted above. This has the advantages of reducing duplicative table lookups and all the associated costs/complexities related to maintaining separate mapping tables. Direct page addressing is used in the unified mapping scheme.

In addition, in a hybrid application, the NVM could still provide effective performance enhancement even when it has a large amount of bad blocks (e.g., 50%). In one hybrid embodiment, the controller also has efficient address gap handling capability (on gaps caused by the bad blocks). In an alternative hybrid embodiment, the unified addressing scheme does not necessarily require a bridge to work with the controller. The controller can potentially use a raw NVM interface (e.g., ONFI) to access the NVM.

III. Data Command Processing

Figure 3:
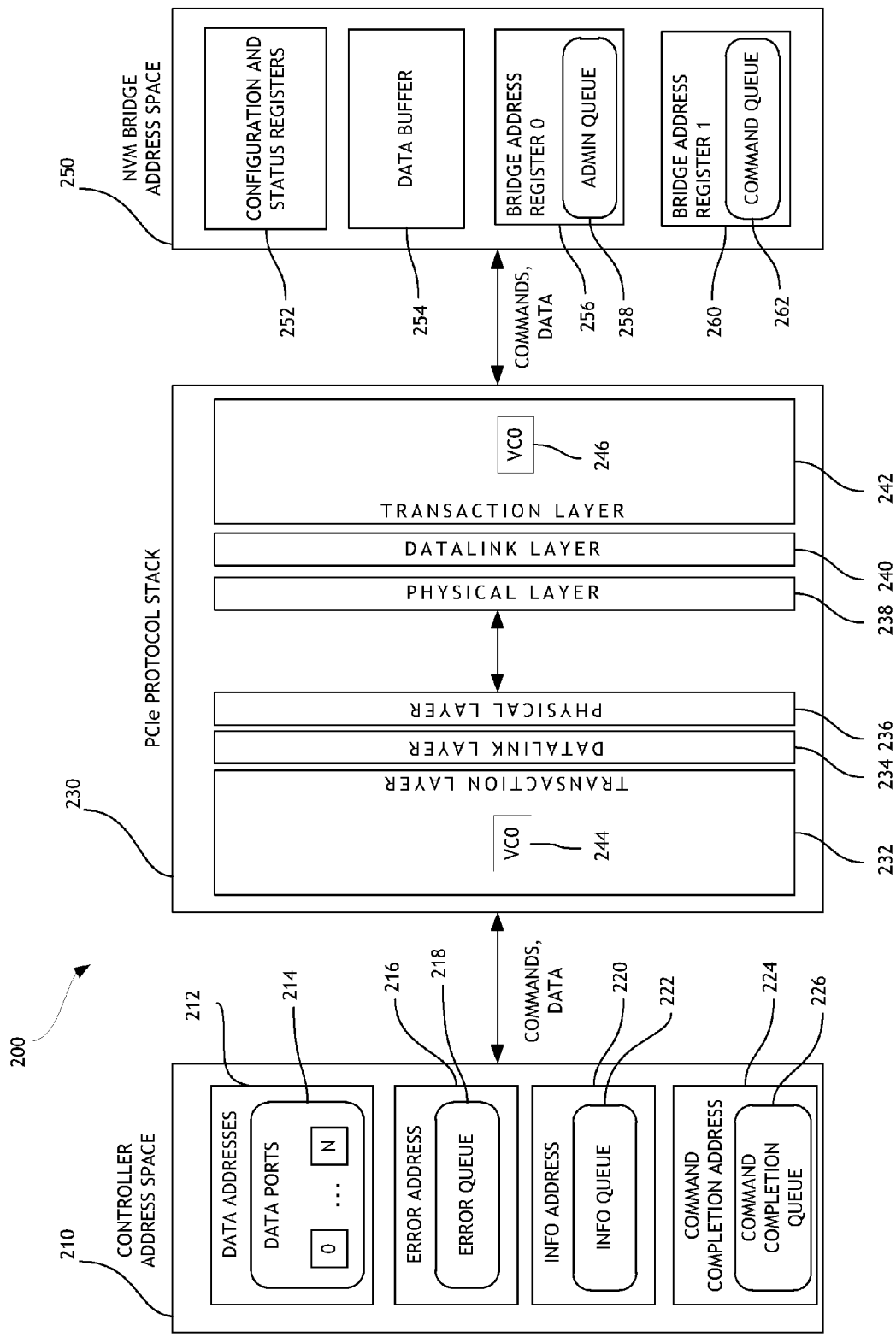
FIG. 3 is a block diagram illustrating the command processing components between the controller and the bridge device according to one embodiment.

FIG. 3 is a block diagram illustrating the command processing components between the controller and the bridge device according to one embodiment. Using the construct of the PCIe interface (or other equivalent interfaces), both the controller and the bridge implement its own address spaces (210, 250) in their respective device memories that can be addressed by the other device. Messages are communicated by writing to queues located within certain addresses within the address spaces, and the addresses are stored in the configuration and status registers 252 in one embodiment. The use of individual queues to handle data access commands and communications between the controller and the bridge will be further described below.

III.A. Command and Admin Queues—Bridge

In one embodiment, the controller sends data access commands to a command queue 262 in the bridge device. This is performed by the controller sending data command messages to the bridge (by writing to the command queue BAR (base address register)). In one embodiment, the command queue has room for sixteen messages, though the number of messages can vary in other embodiments. The command queue can be implemented in a number of ways. One option is full hardware automation where the controller simply writes to a fixed offset. Alternately it can be implemented in memory using a ring buffer or an array based linked list. In one embodiment, the implementation must allow for efficient insertion and notification with minimal bus traffic. In one embodiment, the controller knows the current queue depth based on the number of status responses the bridge has sent back (e.g., a message to the controller's completion queue indicating completion of a command). Note that the data commands are much smaller than the actual data. A given record slot in the queue is considered available once the bridge sends back a completion status or an error report.

In the embodiment shown in FIG. 3, the bridge side 250 also implements configuration and status registers (CSR) 252, along with an admin queue 258 for receiving, from the controller, command messages related to operation of the command queue (e.g., a message for pausing the command queue) or administrative messages concerning the bridge's operation in general. The admin queue 258 may be implemented in a fashion that is similar to the command queue, such as through full hardware automation or ring buffer. Also, like the command queue, the admin queue may be configured for efficient insertion and notification with minimal bus traffic. Like the command queue, the controller can derive the current queue depth and available slots based on responses from the bridge.

III.B. Status Queues—Controller

On the controller side 210 are a set of data ports 214 at data addresses 212 and a number of status queues. In one embodiment, the status queues include an error queue 218, an information queue 222, and a command completion queue 226. These queues are responsible for receiving messages from the bridge regarding command processing, as well as current status of the bridge and the NVM. Additional details relating to the operation on these queues will be further described below in Sections V and VI.

III.C. Communications Between the Controller and the Bridge

Communications between the controller and the bridge are effected in one embodiment through a PCIe protocol stack 230 which includes a number of layers on both sides, including a transactional layer (232, 242), a data link layer (234, 240), and physical layer (236, 238). While PCIe is used in this disclosure to illustrate the operation of the controller and the bridge, other similar standards can be used as well.

The PCIe transaction layer assigns transmit credits based on how much room is left in its Virtual Channel (VC) buffer space. According to the PCIe specification, devices must implement VC0, though some devices implement additional VC to ensure high priority messages have dedicated resources. Packets are directed to the appropriated VC based on their Traffic Class (TC). The TC is also used to determine priority when packets are flowing over the PCIe fabric. Higher TC packets are generally given priority by the root complex, switches and end-devices.

In one embodiment, the controller is designed to operate using only VC0. In one embodiment, though the bridge may implement additional VC, it must be configurable so that it can operate in single VC mode. The messages communicated between the controller and the bridge will be better understood in view of the following brief description of the data processing flow. To service a read command from the host, the controller may first send a command message to the bridge's command queue. Once the bridge processes the command message, it will read the requested data from the NVM and send the read data back to a corresponding data port on the controller side. This action triggers the data path on the controller, which leads to the data being sent back to the host. Conversely, to service a write command from the host, the controller may first send a command message to the bridge's command queue. Once the bridge processes the command message, it will read from a corresponding data port on the controller side. This action triggers the data path on the controller, which leads to the write data being sent from a buffer in the controller to the bridge for writing to the NVM.

The controller in one embodiment communicates with the bridge using three message types of increasing priority: data to be written to the NVM for write commands (0), messages for the bridge's command queue (1), and messages for the bridge's admin queue (2). Those skilled in the art will recognize that different priorities may be assigned to these messages, and the messages could be combined into fewer types or divided into more types depending on the implementation. In one embodiment, under normal conditions, the controller sends a steady stream of data packets to the bridge.

In one embodiment, the bridge interacts with the controller using its own set of prioritized message types (listed here in increasing priority): data read from the NVM for read commands (0), messages for the controller's completion/info queues (1), and messages for the controller's error queue (2). Those skilled in the art will recognize that different priorities may be assigned to these messages, and the messages could be combined into fewer types or divided into more types depending on the implementation. As will be further described below, to facilitate fast processing of data access commands, a read or write by the bridge to a data port in the controller automatically triggers the data path in the controller. In one embodiment, it is not uncommon for the bridge to process several commands in parallel. In one embodiment, the bridge uses the completion queue 226 to notify the controller when commands have completed successfully. In additional, non-critical messages are sent to the info queue 222 while detailed error reports are sent to the error queue 218. In other embodiments, these queues may be combined into fewer queues (with different message types being distinguished by special flags or implied address values) or separated into more queues (e.g., different error queues for different types of error or different info queues for different types of information returned from the bridge).

In other embodiments where a different interface than PCIe is used, the PCIe protocol stack may be replaced with the appropriate stacks/layers of that interface. Those skilled in the art will recognized that other equivalent standardized interfaces (e.g., eMMC) may be adapted to replace PCIe. In other embodiments, a custom/proprietary interface may be used to handle communications between the controller and the bridge.

IV. Implied Command Tag ID and Triggering the Data Path

Figure 4:
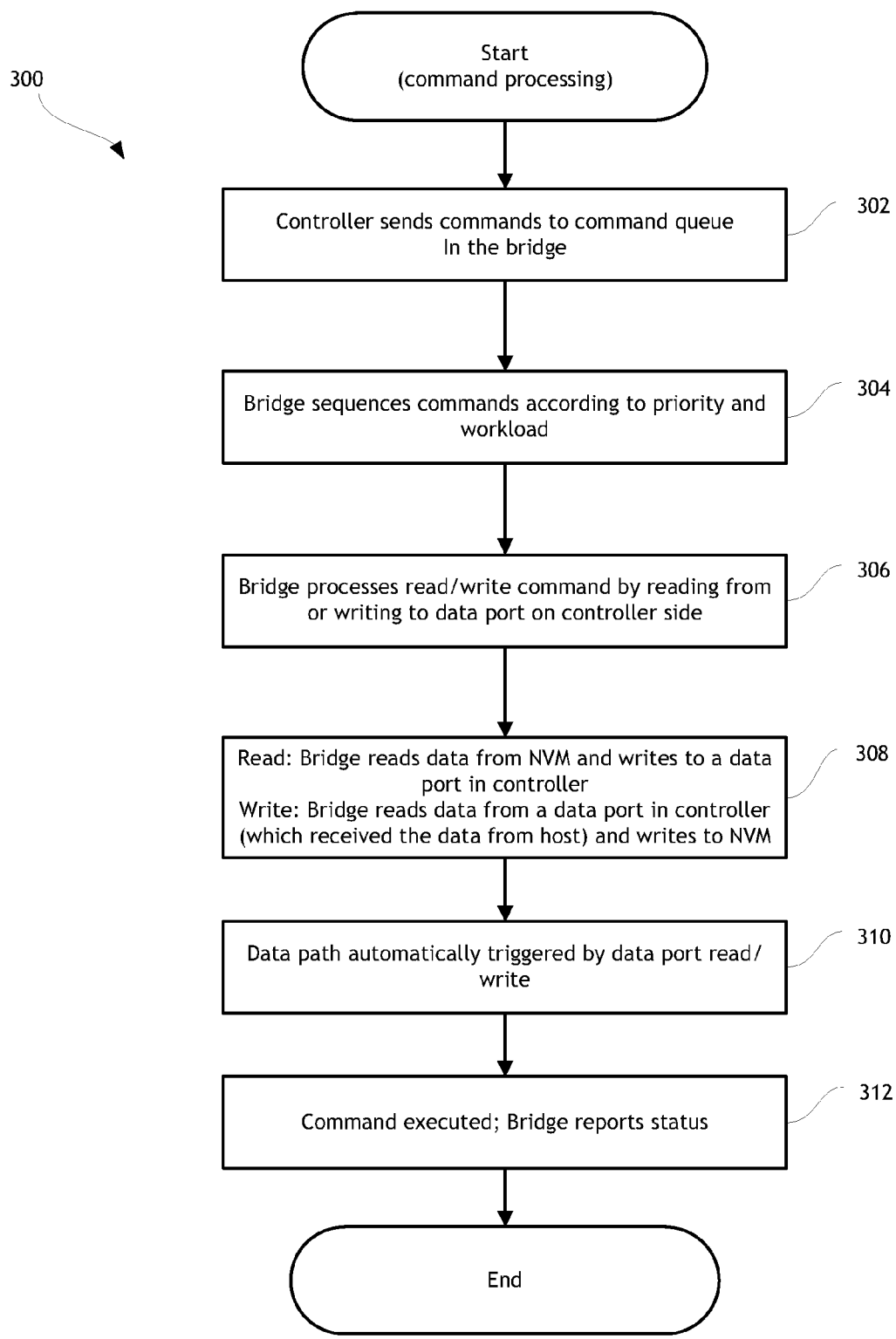
FIG. 4 is a flow chart showing the data processing sequence according to one embodiment.

FIG. 4 is a flow chart showing the data processing sequence according to one embodiment. As discussed above, the controller in one embodiment initiates the sequence in block 302 by sending data access commands (e.g., read, write, erase) to the command queue 262. A command sent to the command queue may include fields such as: a tag field, a priority field, a list of pages, and bits to control the XOR parity accumulator. In addition, some commands may specify an address location from which parity is to be read, and an address location to which parity is to be written post operation. The location information may be provided for RAID parity striping as well. In block 304, the bridge sequences these commands in the queue optimally based on their priority and the bridge's current workload. In block 306, when the bridge is ready to start working on a given command, it performs a read or a write operation on the appropriate data port 214 to trigger the data path on the controller side. In particular, in one embodiment, the data path includes logic for processing data transferred between the controller and the bridge. For example, for a write, write data is read from a memory buffer in the controller and processed by the data path (e.g., adding additional metadata) before it is sent to the bridge for writing to the NVM. Similarly, for a read, the data path also processes the incoming data from the bridge (e.g., stripping out metadata). The use of the data path on the controller simplifies the overall design and minimizes work that the bridge needs to perform for each command. Given the above, the data path needs to be configured/set up for the particular command that is currently being processed, so that the data to be transferred can be properly processed as being associated with the current command. This set up/configuration could be performed through some automation in the data path or by firmware on the controller processor 136. In either scenario, a read/write of a data port by the bridge in one embodiment triggers this configuration of the data path on the controller side. In other embodiments, multiple data paths may be used with each handling a subset of the data ports, though in this scenario the data paths would still operate based on the above described principles.

As shown in block 308, for a read command, the bridge obtains data from the NVM and writes to a corresponding data port 214 and for a write command, the bridge reads data from a corresponding data port 214 and writes to the NVM. In other embodiments, other less efficient variations are possible. For example, the controller may read and write the transactions, and the bridge may simply notify that attention is needed via an interrupt, etc.

In one embodiment, each command in the bridge command queue 262 has a tag. When the bridge is ready to start working on a command that involves a data transfer, it accesses the data port 214 that matched the command tag. In one embodiment, the data path in the controller has sixteen ports defined by two values in the bridge CSR: base address and port size. These two values are sufficient to derive the location of all sixteen ports. In other embodiments, a different number of ports and/or a different address derivation scheme may be used.

Figures 5, 6:
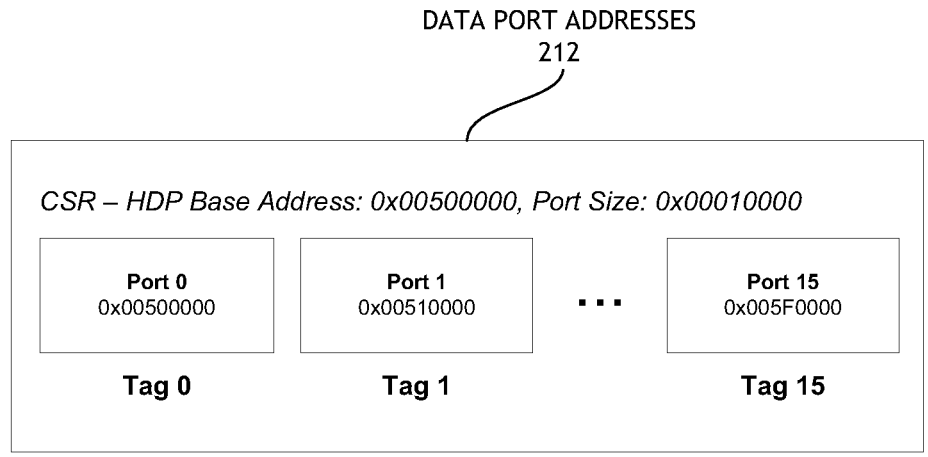
FIG. 5 illustrates example data ports and how each port corresponds to a different command tag.
FIG. 6 shows example unordered commands and the flash dies they are accessing.

FIG. 5 is a block diagram that shows how each port corresponds to a different command tag according to one embodiment. FIG. 5 expands the view of data addresses 212 from FIG. 3 and illustrates how data ports are correlated with command tags. As shown, each data port 0 to 15 (with its own unique assigned address) is associated with a command tag. In one embodiment, commands are limited to eight pages. Under such an arrangement, the ports need to be at least 64K apart, though the spacing can be larger. Thus, performing a read or write on the port matching the command tag allows the controller to automatically identify the matching command and initiate the data path automation without additional control overhead.

For example, when the bridge accesses a particular data port address in the controller (e.g., No. 0 of 15) defined by the associated PCIe address range, the controller will understand that this is for the command associated with that tag. Thus, there is no need for the bridge to separately send a command tag, which reduces overhead as each additional communication between the bridge and the controller adds to the overall latency. To accomplish this, in one embodiment the controller automatically decodes the address (split the upper bits), and loads the registers to trigger/prime the host data path for processing (initiating the automation). However, those skilled in the art will recognize implementations other than the above described implied tag implementation could be used. For example, the bridge could send an explicit command tag message to the controller to indicate the command the bridge is currently working on and which data port it intends to use. The priming of the data path would then be dependent on that explicit command tag message. In other embodiments, the command tags as described above need not be used. Generally, any command configuration data that enables the bridge and/or the controller to keep track of the data port and command correlation can be used.

Returning to FIG. 4, in block 310, the controller data path is automatically triggered when a data port is accessed by the bridge. In one embodiment, the data path must complete a command once it has been triggered, as there is no mechanism that allows the bridge to work on parts of a command. In one embodiment, when the bridge starts a write operation, the controller sends all pages to be written to the bridge in the order specified by the command message. Conversely, the controller may also require the bridge to send data for a read operation in the order specified by the command message. While the example provided herein shows one data path that handles both reads and writes, in other embodiments multiple data paths could be used. For example, in a multiple data path implementation each data path could be dedicated to a sub-set of the data ports, and/or certain data paths may be configured to handle reads and other data paths may be configured to handle writes. Finally, in block 312, the bridge executes the command and returns status message(s) to one or more queues on the controller side. The queues on the controller side (e.g., completion, info, and error queues) will be described in below in Section VI. In an alternative embodiment, in lieu of using tags, the bridge may send the controller a block of data to program the data path. The bridge does not have to know what the data does. The block of program data would be sent first by the controller to the bridge along with the command. The bridge would then send the block back. The program data can be sent ahead of the data to be transferred for the command or it can be sent to another queue.

In another embodiment, instead of the implied command tag/data path trigger mechanism describe above, the controller-bridge could communicate in a controller-push model in which the controller sends data along with the commands to the bridge. The bridge would thus need a large volatile memory buffer capacity to hold the user data from the controller for the various commands in the bridge's command queue. This implementation could reduce latency but potentially increase the cost of bridge implementation as a large memory buffer will need to be added to the bridge. This also leads to increased power consumption by the bridge.

V. Advanced Queuing Management

In one embodiment, the bridge supports a number of queues. The bridge in one embodiment has at least one command queue 262 and one control/admin queue 258, as shown in FIG. 3. The admin queue 258 supports queue management commands or other general operational commands from the controller. For example, the controller can send a command to the admin queue to ask the bridge to pause processing commands in the command queue or clear the command queue altogether.

In one embodiment, the command queue supports sophisticated queuing and out-of-order execution, while the admin queue is ordered. The various queues on both the controller and bridge sides can have a mixture of commands outstanding, and can be asynchronous. The mixture of commands is particularly notable in the bridge command queue as compared to the ONFI specifications. ONFI provides some basic queuing capability through its "read multiple" and "write multiple" commands. However, there can be no mixing of different types of commands. Moreover, commands are batch processed, which means that the commands must clear the queue completely before more commands can be accepted.

In contrast, the advanced queuing capability of the bridge can (1) accept mixed command types, (2) support out of order execution, and (3) allow the controller to send additional commands without having the queue(s) be cleared first. The bridge can also accept special commands from the controller to specify that a certain command be executed with high priority. The bridge manages several channels so it has the flexibility to re-order the commands it receives.

V.A. Command Ordering

The command queue may be implemented in one embodiment as a single queue handling commands with various types of priority indicated by queuing flags (e.g., "priority," "ordered," "unordered," and "background"), or as several separate queues based on the queuing flags. Data commands may be unordered by default, and subject to ordering by the bridge in order to take advantage of hardware optimizations and media utilization. In one embodiment, "priority" and "ordered" flags are used by the controller to indicate deviation from that default.

FIG. 6 shows four example unordered commands and the flash dies they are accessing. Although many permutations are possible, this example set of read and write commands are used to illustrate operation interleaving. In deciding the order in which to process these commands, the bridge needs to factor in the data path constraints described above in Section IV. The bridge can achieve a significant performance advantage by developing an intelligent sequencing algorithm that can easily identify non-conflicting commands.

If the commands A-D are write commands, the bridge may maximize concurrency by executing commands A, C, and D in parallel (A and B can't be executed in parallel). If the bridge has sufficient buffer space, it could also pull down the data from the controller for command B and work on the portion going to die 2. On the other hand, if the commands A-D are read commands, the bridge may maximize concurrency by executing commands A, C, and D in parallel. Though it can read the data on die 2 for command B, the bridge may be required to send the data to the controller in the order specified by the command header.

V.B. Background Priority

A unique feature in the queuing model is the implementation of a background priority in one embodiment. The background priority lets the bridge decide when to execute the command. In one embodiment, commands with the "background" flag are unordered and given the lowest priority. They may also be exempt from the command promotion timer requirement, which is a time value dictating a deadline by which a certain command should be executed. In one embodiment, although the order of command execution is left up to the bridge, a command cannot sit in the queue indefinitely. When the bridge is choosing between unordered commands on the pending list, it will give preference to commands that have expired promotion timers. The timeout value is set by the controller in the bridge control CSR field in one embodiment.

The bridge may work on these "background" commands when it has available resources. For example, background priority can be used for data retention and health scan tasks. As another example, the controller may send down a block erase command with the background flag set. The bridge will perform the erase operation when the target die is not needed for other commands in the queue. In one embodiment, the "ordered," "priority," and "background" flags are mutually exclusive. This background command feature is currently absent in in-band I/O interfaces (e.g., UFS, eMMC, SAS or SATA), as they do not support background long running tasks.

VI. Completion, Info, and Error Queues

As previously shown in FIG. 3, the controller may also have several queues to enable the bridge to return information related to data commands (completion, error, etc.). In addition, the bridge can report other status, errors, and indicate non-critical information (i.e., info/health reports) related to the operation of the bridge and the NVM. These queues may be processed sequentially and may be implemented in memory as ring buffers with fixed record size in one embodiment. In one embodiment, the controller implements three status queues to simplify command transactions. The bridge uses the completion queue 226 to indicate when it has successfully completed one or more commands. The info queue 222 is used for non-critical information such as health reports. The error queue 218 allows the bridge to send detailed reports when one or more command fails. Those skilled in the art will recognize that the three queues could be combined into fewer queues or divided into additional queues. Alternatively, in lieu of these queues, the controller and the bridge may use an interrupt based system whereby the bridge would send an interrupt when it wishes to communicate with the controller. The controller may then check a message stored on the bridge side.

In one embodiment, the controller sets the base address and size for each queue in the CSR. In one embodiment, there is no need to communicate the number of queue entries as both sides have sufficient information to derive this value. In one embodiment, the bridge needs to generate an error if the controller attempts to configure a queue with less than one entry.

In one embodiment, the bridge is configured to be required to write to the next valid slot and keep track of how many entries it has written. The address for each slot is derived from the start address and the maximum message size. Every queue entry is required in one embodiment to start on a valid boundary. In one embodiment, the messages are padded to the full record size as the act of writing the last double word (DW) is often used to trigger hardware automation.

The bridge may write multiple entries to one queue in a single operation. One embodiment implements a doorbell-mode, in which the controller does not act on the new entries until the bridge writes to the associated doorbell register with the count of records it has added. In an automation-mode, the controller generates its own signaling when one or more entries are added to the queue. The queue mode (automation or doorbell) may be configured in the CSR.

The controller side queues are sized to match the maximum number of potential entries in one embodiment. In general terms, these values are proportional to the bridge's command queue depth. Given that each command has a tag, the controller may not reuse a tag until it has received status and cleaned up the queue space.

VI.A. Completion Queue

Given that not all commands result in bus transfers, the controller expects to be notified when data and admin commands have completed successfully. Trying to embed the status in regular data path messages creates alignment issues and other edge cases. Instead, in one embodiment the bridge simply writes a completion notice to the completion queue on the controller side. Although other implementations are possible, in one embodiment it is sufficient to send a 32-bit Double Word (DW) where each bit is set to one to represent a command that has completed successfully. For example, where there are 16 slots each in the admin and command queues, the upper 16 bits of the DW can map to admin tags while the lower 16 bits can map to command tags. Though the bridge could send status promptly, system efficiency improves when multiple completion tags are combined. Given that each of these bridge queues is 16 deep in this example embodiment, the completion queue is guaranteed to be 32 entries deep. However, in other embodiments different queue depths for the two queues are possible, and the completion queue mechanism is adjusted accordingly.

VI.B. Info Queue

In one embodiment, the bridge can send general system/status information messages to the controller by writing to the info queue 222 (i.e., writing to the info queue address range 220). Health reports of the NVM, for example, are sent to this queue, and other messages are possible. In one embodiment, this queue is 16 entries deep. In one embodiment, the controller may not issue active or concurrent health scans if there are outstanding read commands. Active and concurrent health scans of the NVM are performed by the bridge at the direction of the controller. Active scans of the NVM are performed without returning of data while concurrent scans are performed concurrently with normal data access operations.

VI.C. Error Queue

In one embodiment, the bridge sends error messages to the controller error queue 218 by writing to the error queue address range 216. In one embodiment, this queue is 16 entries deep.

VII. XOR Parity Accumulator Management

In one embodiment, the bridge includes a XOR parity accumulator that is managed by the controller, which makes the data path simpler in the controller. The controller manages the XOR parity accumulator through XOR parity accumulator commands. In one embodiment, the controller issues common control operation instructions/commands (e.g., embedded within read and write commands) such as: (1) clear before accumulate (operation: read, write), (2) accumulate parity in a buffer (operation: read, write), (3) write a parity buffer to a page in NAND (operation: write). In one embodiment, the instructions/commands are communicated in three bits in the data access command fields. To keep command size down, dedicated commands may be used for less common XOR parity accumulator operations such as: load a parity buffer from a page in NAND, read a parity buffer over the bus, load a parity buffer over the bus, and reset all the parity buffers.

VIII. Other Features

In one embodiment, the bridge supports several power management commands. Returning to FIG. 2A, the bridge is coupled with, and manages, a power controller 170 in one embodiment, which may include a power throttle controller 172. The bridge can operate under several power budgets specified by the controller 130. It may be set to operate in a throttled state in which the bridge minimizes power usage under a smaller power budget cap. The power management may be implemented through monitored control pins or PCIe based messaging. In another embodiment, the bridge may use an alternate power source.

The bridge may on its own implement an energy-credit based throttled policy according to an available number of credits presently available for command execution. In the alternative, the controller may implement the energy-credit based policy and the bridge is configured to support power commands issued by the controller based on that policy. One example policy allows the controller and/or the bridge to set a maximum number of concurrent operations and/or a time delay between operations such that the average power consumed stays under a threshold. Various types of energy-credit based policy are further described in co-pending application Ser. No. 13/216,177, entitled "Non-volatile Storage Subsystem With Energy-Based Performance Throttling," filed on Aug. 23, 2011, the disclosure of which is hereby incorporated by reference. In another embodiment, the bridge is configured to report power consumption for various operations and allow the controller to set explicit limits through an exposed interface.

In another embodiment, unlike common bridge implementations, the bridge exposes the NAND level information that is typically available over an ONFI interface but hidden in other bridge-controller architectures, as many controllers in those architectures do not manage at the physical page level. Below are some example values that the controller can access:

Device manufacturer (ONFI Byte 32-43)
Device model (ONFI Byte 44-63)
JEDEC mfg ID (ONFI Byte 64)
Date code (ONFI Byte 65-66)
Data bytes per page (ONFI Byte 80-83)
Spare bytes per page (ONFI Byte 84-85)
Number of pages per block (ONFI Byte 92-95)
Number of blocks per die (ONFI Byte 96-99)
Number of die per Bridge (new)
Number of bits per cell (ONFI Byte 102)
Bad block max per die (ONFI Byte 103-104)
Block P/E endurance MLC (ONFI Byte 105-106)
Block P/E endurance SLC (new)
Number of planes (ONFI Byte 113)
Max page program time (usec) (ONFI Byte 133-134)
Max block erase time (usec) (ONFI Byte 135-136)
Max page read time (usec) (ONFI Byte 137-138)
Max multi-plane page read time (usec) (ONFI Byte 152-153)

In some embodiments, because the controller is in a unique position to manage the NVM at both the block and page levels, the exposure of these values are helpful in assisting the controller in its management of the NVM.

In one embodiment, the bridge also supports at least some configuration details listed below. At least some of these relate to the features described above:

Command Promotion Timeout—In one embodiment, when the bridge is choosing between unordered commands on the pending list, it will give preference to commands that have expired promotion timers. This timeout does not apply to background commands in one embodiment, as discussed above.

Data Port Base Address—In one embodiment, the host has sixteen ports, each corresponding to a message tag. The port size defined below along with the base address allows the Bridge to derive the address of each data port. The bridge access these ports when executing read and write commands.

Data Port Size—In one embodiment, the port size indicates how much data can be written to each port. In one embodiment, the port is guaranteed to match the maximum command size. In one configuration, the lower two bits are zero.

Completion Queue Base Address—In one embodiment, the bridge sends command completion notifications to this queue.

Completion Queue Size—In one embodiment, this is the size in bytes. The lower two bits are zero in one configuration.

Completion Queue Doorbell—In one embodiment, the bridge writes the count of records it has just added to the Completion Queue. The doorbell is disabled when set to zero and the queue is assumed to be in auto-mode.

Completion Queue Max Record Size—In one embodiment, the maximum message size sent to this queue. In one configuration, this is a read-only value set by the bridge.

Info Queue Base Address—In one embodiment, the bridge writes non-critical reports to this address.

Info Queue Size—In one embodiment, this is the size in bytes. The lower two bits are zero in one configuration.

Info Queue Doorbell—In one embodiment, the bridge writes the count of records it has just added to the info queue. The doorbell is disabled when set to zero and the queue is assumed to be in auto-mode.

Info Queue Max Record Size—In one embodiment, the maximum message size sent to this queue. This is a read-only value set by the bridge.

Error Queue Base Address—In one embodiment, the bridge writes error reports to this address.

Error Queue Size—In one embodiment, this is the size in bytes. The lower two bits are zero in one configuration.

Error Queue Doorbell—In one embodiment, the bridge writes the count of records it has just added to the error queue. The doorbell is disabled when set to zero and the queue is assumed to be in auto-mode.

Error Queue Max Record Size—In one embodiment, this is the maximum message size sent to this queue. This is a read-only value set by the bridge.

In one embodiment, the bridge can support an SLC mode. That is, the controller can specify that certain portions of the MLC NAND operate as SLC. While this is an available option in ONFI, many common bridge implementations do not support this capability.

IX. Inline Parameter Service

A common practice for optimizing NAND endurance is to maintain parametric data such as optimal read threshold settings per page or per block and then use that data when reading or programming specific pages. Two possible options exist for storage of such data. First, this data could be stored in a volatile memory (e.g., DRAM) associated with the controller when high performance is desired. Second, the data could be stored in the NVM and accessed ahead of each NVM operation when the performance requirement is not critical, or when including enough volatile memory on the controller is not practical. The second option places a burden on performance and memory resources.

IX.A. Overview

Figure 7:
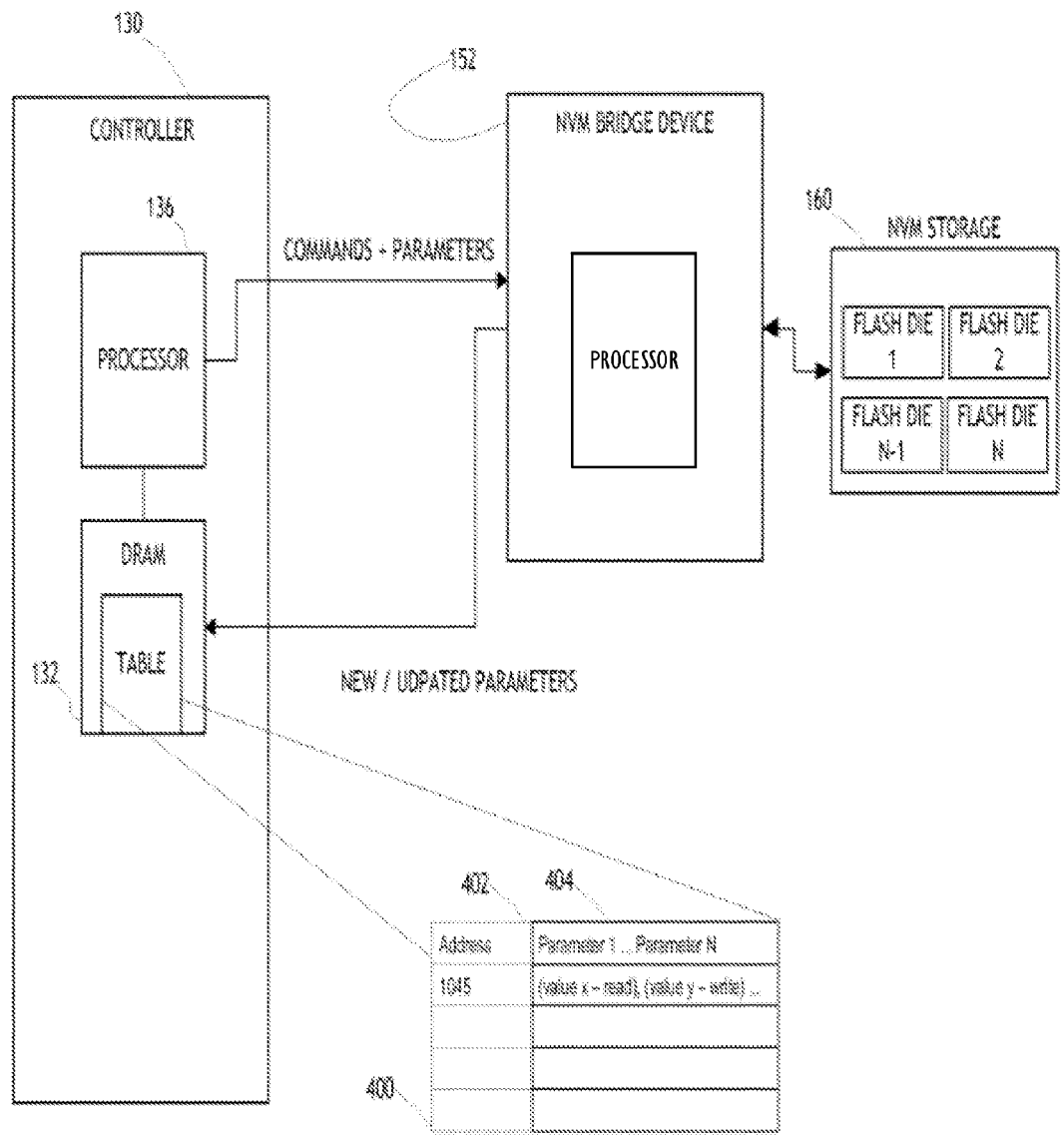
FIG. 7 shows an example illustration of an inline parameter service according to one embodiment.

FIG. 7 illustrate some embodiments of the bridge-controller setup that includes a mechanism whereby a NVM read/write command initiator (e.g., the controller 130) can access a dataset of parametric information needed for NVM memory optimization (e.g., endurance, error rate, performance) in a memory 132 (e.g., DRAM). In one embodiment, the controller 130 automatically incorporates a portion of this dataset that correlates to the NVM memory address(es) being accessed in each NVM command to the bridge device 152. This allows the device that processes the NVM request (e.g., the bridge device 152) to do so optimally without needing a large on-board/associated SRAM or DRAM to store such parametric data (which would incur a cost penalty) or needing to perform additional NVM memory accesses to retrieve the data (which would incur a performance penalty). In other words, the bridge device is allowed to focus on processing the NVM commands since the commands provide all the parameters necessary for the execution of the commands.

As between the controller and the bridge device, the bridge device is closely coupled with the NVM and thus is in the best position to determine the optimal parameters to access the NVM based on current condition/historical usage. Thus, one embodiment includes an Inline Parameter Service (IPS) that allows the bridge device 152 to store parameters on a memory associated with the controller 130, with the parameters being automatically appended by the controller 130 to each command as described above. In one embodiment, the controller does not need to be aware of how the parameter data is used; it could simply read the applicable table entry based on the NVM addresses and commands being sent. In addition, the specific table format can vary depending on the various embodiments. In one embodiment the format includes a header that allows the controller to determine how table entries are associated with specific NVM commands. As shown in FIG. 7, the parameter table 400 may be stored in DRAM 132 of the controller 130. In some embodiments, the controller may include a non-volatile memory to store parts or all of the table 400.

IX.B. Boot-up Process; Table Updates

In one embodiment, the controller 130 reads the initial table data during the boot sequence using an IPS Read command sent to the bridge device 152. The bridge device 152 can make small updates to the table 400 by sending IPS Update messages to the controller 130. For example, when a block reaches a certain P/E cycle threshold, the bridge device can send an updated parameter associated with that block to the table. The bridge device can also send an IPS Refresh signal which will prompt the controller 130 to send another IPS Read command to the bridge. Alternatively, updates can be handled via the info queue, or by other methods such as through an interrupt. The table 400 in one embodiment is periodically flushed (copied) to the NVM. For example, it may be flushed to a reserved system area within an SLC-mode area of the NVM since SLC memory is considered more reliable. The reserved system area may include other system data that is read by the controller during power on to load into DRAM/SRAM.

In one embodiment, the parameters 404 are associated with individual addresses 402. For example, each page address may have an entry, and may be associated with several bytes of data (e.g., 4 bytes per entry) of a parameter. In another embodiment, a page address can be associated with multiple parameters. For example, a first parameter value may be associated with read operations for that address (e.g., reference voltage threshold adjustment) and a second parameter value may be associated with write operations for that address.

IX.C. Automatic Append of Parameters

Figure 8:
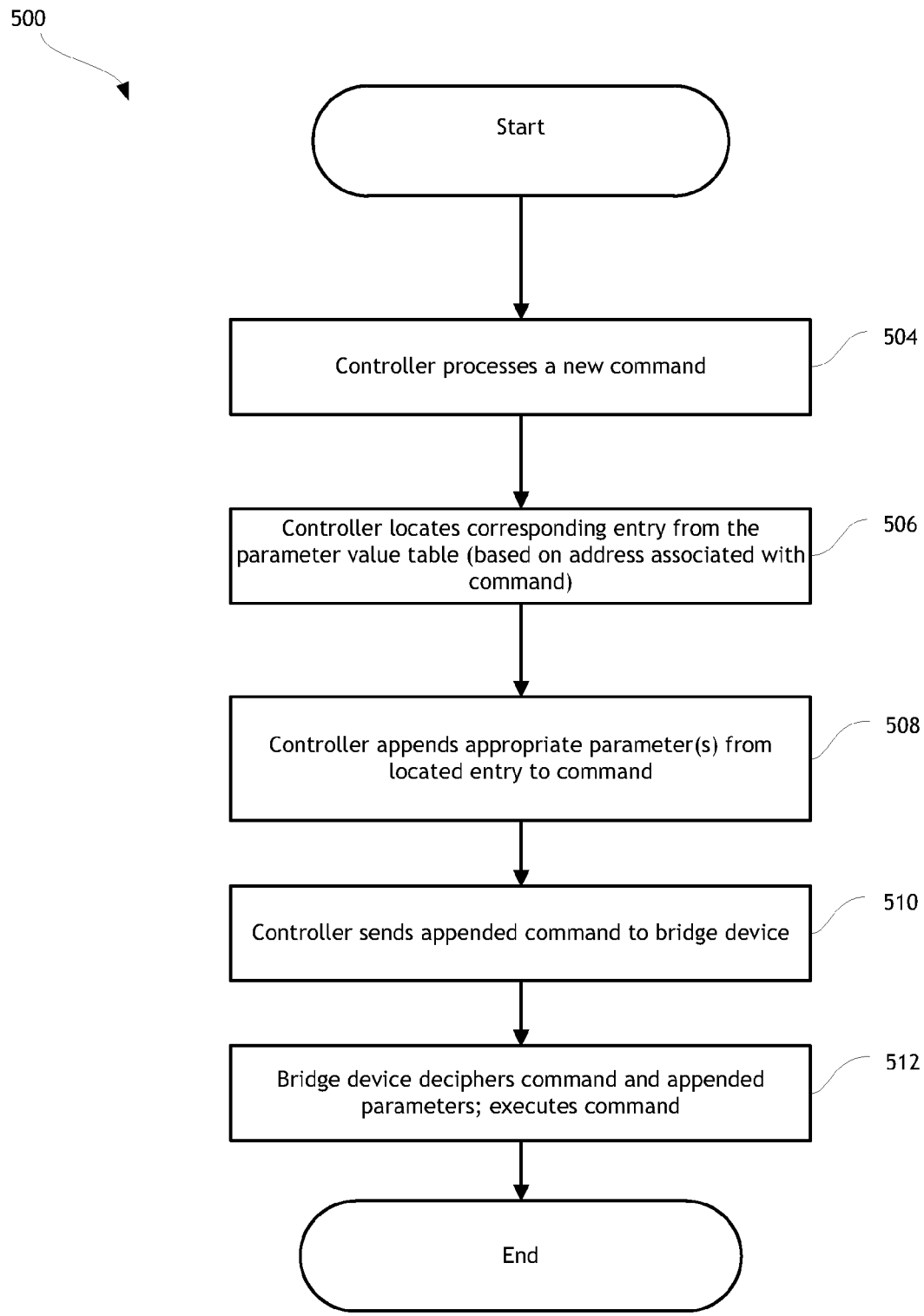
FIG. 8 is a flow chart showing the incorporation of parameters into data storage commands according to one embodiment.

FIG. 8 shows the process by which the parameters are associated with the storage access commands according to one embodiment. At least a portion of the process of FIG. 8 may be executed by the processor 136 of the controller 132 in one embodiment. At block 504, the controller processes a given command. At block 506, the controller 132 locates, within the table 400, an entry corresponding to the address in the command. At block 508, the controller then appends the corresponding parameter values in the entry to the command and (at block 510) sends the command and parameter values to the bridge device. The append may be performed based on a pre-arranged format that is mutually understood by the controller and the bridge device. At block 512, the bridge device extracts the appended parameter values according to the pre-arranged format and executes the command accordingly. For example, the format may include a number of predetermined off-set locations (e.g., byte or bit offset) whereby certain parameters can be located. In one embodiment, some parameter values may be associated with a particular type of data operation (e.g., read or write). For example, a parameter may be related to an adjusted voltage threshold for a read operation. The association may be indicated by a command descriptor such that the controller can determine the proper values to append for a given operation. For example, if a read command is involved, the controller may append just the values that have a "read" command descriptor and not those values that have a "write" command description, or vice versa.

The table 400 may also be used for other purposes. For example, the bridge device may elect to store debugging information, trace log information, metrics/counters. In addition, the bridge device may store media health scan logging information. The table 400 thus provides another way for the bridge device to report NVM-specific information to the controller.

X. Alternative Embodiments; Conclusion

As used in this application, "non-volatile memory" typically refers to solid-state memory such as NAND flash. However, the systems and methods of this disclosure may also be useful in more conventional hard drives and hybrid drives including both solid-state and hard drive components. As such, while certain internal operations are referred to which typically are associated with solid-state drives, such as "wear leveling" and "garbage collection," analogous operations for hard drives can also take advantage of some embodiments of this disclosure. Solid-state memory may comprise a wide variety of technologies, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM (non-volatile memory) chips. The solid-state storage devices (e.g., dies) may be physically divided into planes, blocks, pages, and sectors, as is known in the art. Other forms of storage (e.g., battery backed-up volatile DRAM or SRAM devices, magnetic disk drives, etc.) may additionally or alternatively be used.

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, the various components illustrated in FIGS. 1D, 2A, 2B, 3, and 7 may be implemented as software and/or firmware on a processor, ASIC/FPGA, or dedicated hardware. For example, those skilled in the art will appreciate that in some embodiments, the actual steps taken in the processes shown in FIGS. 4 and 8 may differ from those shown in the figures. Depending on the embodiment, certain of the steps described in the example above may be removed, others may be added, and the sequence of steps may be altered and/or performed in parallel. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data storage drive, comprising:
an array of one or more solid-state storage devices;
a bridge device coupled with the array of one or more solid-state storage devices over an Open NAND Flash Interface (ONFI) interface, the bridge device comprising a first processor configured to perform channel management processing for the one or more solid-state storage devices; and
a controller comprising a second processor and a volatile memory storing a parameter table including optimal read threshold data associated with each of a plurality of addresses of the one or more solid-state storage devices, wherein the controller is configured to:
provide a data access command including physical address information to the bridge device over a Peripheral Component Interconnect Express (PCIe) interface using the second processor; and
automatically retrieve read threshold data from the parameter table based on the physical address information and append the read threshold data to the data access command;
wherein the bridge device is configured to:
determine the read threshold data based at least in part on a current condition of at least a portion of the one or more solid-state storage devices;
provide the read threshold data to the controller using the first processor, thereby causing the read threshold data to be stored in the parameter table;
receive, from the controller, the data access command including the read threshold data and the physical address information; and
use the first processor in executing the data access command in the array of one or more solid-state storage devices based at least in part on the read threshold data and the physical address information.

2. The data storage drive of claim 1, wherein the bridge device is further configured to:
determine updated read threshold data based at least in part on an updated condition of the at least a portion of the one or more solid-state storage devices; and
cause the updated read threshold data to be stored in the parameter table.

3. The data storage drive of claim 1, wherein the controller is configured to automatically append the read threshold data to the data access command by at least:
locating an entry in the parameter table with an address that matches an address of the data access command; and
appending the read threshold data to the data access command;
wherein the read threshold data was stored in the located entry.

4. The data storage drive of claim 3, wherein appending the read threshold data further comprises determining a type of the data access command and appending read threshold data associated with the determined type of data access command.

5. The data storage drive of claim 1, wherein the controller is configured to, upon initialization, retrieve a persistent copy of the parameter table from the one or more solid-state storage devices and load the parameter table into the volatile memory.

6. A method for managing parameters related to storage access operations in a data storage drive, the method comprising:

by a first processor of a bridge device coupled with an array of one or more solid-state storage devices, the first processor being configured to perform channel management processing for the one or more solid-state storage devices:
determining read threshold data based at least in part on a current condition of at least a portion of the one or more solid-state storage devices;
providing the read threshold data to a controller over a Peripheral Component Interconnect Express (PCIe) interface, thereby causing the read threshold data to be stored in a parameter table including optimal read threshold data associated with each of a plurality of addresses of the one or more solid-state storage devices, the parameter table being stored in a volatile memory of the controller;
receiving, from the controller, a data access command including the read threshold data from the parameter table and physical address information; and
executing the data access command in the array of one or more solid-state storage devices over an Open NAND Flash Interface (ONFI) interface based at least in part on the read threshold data;
wherein the controller comprises a second processor, the controller being configured to automatically retrieve the read threshold data from the parameter table based on the physical address information and append the read threshold data to the data access command using the second processor.

7. The method of claim 6, wherein the controller is configured to automatically append the read threshold data to the data access command at least in part by determining a type of the data access command, wherein the read threshold data is associated with the determined type of data access command.

8. The method of claim 6, further comprising, by the bridge device:
determining updated read threshold data based on an updated condition of the one or more solid-state storage devices; and
storing the updated read threshold data in the parameter table.

9. A bridge device usable for managing data in a data storage drive, the bridge device comprising:
a first processor;
wherein the bridge device is coupled with an array of one or more solid-state storage devices over an Open NAND Flash Interface (ONFI) interface and configured to perform channel management processing for the one or more solid-state storage devices; and
wherein the bridge device is configured to:
periodically send, to a controller of the data storage drive over a Peripheral Component Interconnect Express (PCIe) interface, parameter data related to one or more of endurance, error rate, and performance of the array of one or more solid-state storage devices, thereby causing the parameter data to be stored in a parameter table including parameter data entries associated with each of a plurality of addresses of the one or more solid-state storage devices, the parameter table being stored in volatile memory of the controller;
receive a data access command from the controller, wherein the data access command includes at least a portion of the parameter data and physical address information;
extract the at least a portion of the parameter data from the commands; and execute the data access command in the array of one or more solid-state storage devices based at least in part on the extracted parameter data;

wherein the controller is configured to automatically retrieve the at least a portion of the parameter data from the parameter table based on the physical address information and append the at least a portion of the parameter data to the data access command.

10. The bridge device of claim 9, wherein the at least a portion of the parameter data is associated with one or more addresses for the data access command.

11. The bridge device of claim 9, wherein the parameter data includes data related to a read voltage threshold of a page.

12. The bridge device of claim 9, wherein the controller is configured to execute data storage commands in a magnetic data storage module.

* * * * *